United States Patent
Van Greunen et al.

(10) Patent No.: US 8,873,518 B2
(45) Date of Patent: Oct. 28, 2014

(54) SYSTEM AND METHOD FOR BROADCASTING MESSAGES TO NODES WITHIN A WIRELESS MESH NETWORK

(71) Applicant: Silver Springs Networks, Inc., Redwood City, CA (US)

(72) Inventors: Jana Van Greunen, Woodside, CA (US); Sterling Hughes, Oakland, CA (US); Peter Hunt, Sunnyvale, CA (US); William E. San Filippo, III, Los Altos Hills, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 212 days.

(21) Appl. No.: 13/625,754

(22) Filed: Sep. 24, 2012

(65) Prior Publication Data
US 2014/0086218 A1  Mar. 27, 2014

(51) Int. Cl.
*H04J 3/00* (2006.01)
(52) U.S. Cl.
USPC .......................................... 370/336; 370/400

(58) Field of Classification Search
USPC ......... 370/328–329, 335–338, 345, 347, 389, 370/392, 400–401, 406, 442, 465, 468, 498
See application file for complete search history.

(56) References Cited

U.S. PATENT DOCUMENTS

| 5,732,078 | A * | 3/1998 | Arango | 370/355 |
| 6,094,686 | A * | 7/2000 | Sharma | 709/240 |
| 8,363,744 | B2 * | 1/2013 | Agee et al. | 375/267 |
| 8,451,928 | B2 * | 5/2013 | Agee et al. | 375/267 |
| 2009/0059843 | A1 * | 3/2009 | Binding et al. | 370/328 |
| 2009/0279481 | A1 * | 11/2009 | Garcia Vidal et al. | 370/328 |

* cited by examiner

Primary Examiner — Kevin Mew
(74) Attorney, Agent, or Firm — Patterson & Sheridan, LLP (57) ABSTRACT

A node within a wireless mesh network is configured to forward a high-priority message to adjacent nodes in the wireless mesh network by either (i) transmitting the message during successive timeslots to the largest subset of nodes capable of receiving transmissions during each timeslot, or (ii) transmitting the message on each different channel during the timeslot when the largest subset of nodes are capable of receiving transmissions on each of those channels.

20 Claims, 4 Drawing Sheets

SYSTEM AND METHOD FOR BROADCASTING MESSAGES TO NODES WITHIN A WIRELESS MESH NETWORK

BACKGROUND OF THE INVENTION

1. Field of the Invention

Embodiments of the present invention relate generally to wireless digital communication and more specifically to a system and method for broadcasting messages to nodes within a wireless mesh network.

2. Description of the Related Art

A conventional wireless mesh network includes a plurality of nodes configured to communicate with one another. A given node within the wireless mesh network may transmit messages to, and receive messages from, neighboring nodes in order to propagate those messages across the entire network. In some situations, an important message must be sent across the wireless mesh network to the different nodes in as little time as possible. To facilitate the delivery of important messages, conventional nodes are configured to periodically tune in to a specific channel that is reserved for the transmission of these important messages.

However, one problem with this technique is that situations requiring the transmission of important messages are quite rare, and so tuning in to the reserved channel is often unnecessary. Further, when a node tunes in to the reserved channel, that node cannot receive other messages (i.e. messages transmitted on non-reserved channels), and so the overall throughput of the wireless mesh network is periodically slowed.

As the foregoing illustrates, what is needed in the art is an improved technique for broadcasting messages across a wireless mesh network.

SUMMARY OF THE INVENTION

One embodiment of the present invention sets forth a computer-implemented method for transmitting a message from a first node residing within a network to a set of nodes residing adjacent to the first node, including dividing the set of nodes residing adjacent to the first node into one or more subsets of nodes, where the nodes within a particular subset of nodes are capable of receiving transmissions on a particular channel during a particular time interval in a sequence of time intervals, where the nodes in subsets of nodes other than the particular subset of nodes receive transmissions on a channel different than the particular channel during the particular time interval, identifying a first subset of nodes in the one or more subsets of nodes that includes more nodes than any of the other subsets of nodes, where the nodes in the first subset of nodes are capable of receiving transmissions on a first channel during a first time interval in the sequence of time intervals, and transmitting the message to the nodes in the first subset of nodes on the first channel during the first time interval.

One advantage of this approach is that nodes residing in the wireless network are not required to periodically tune-in to a reserved frequency to listen for high-priority messages, thereby improving the efficiency and throughput of the wireless mesh network as a whole.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
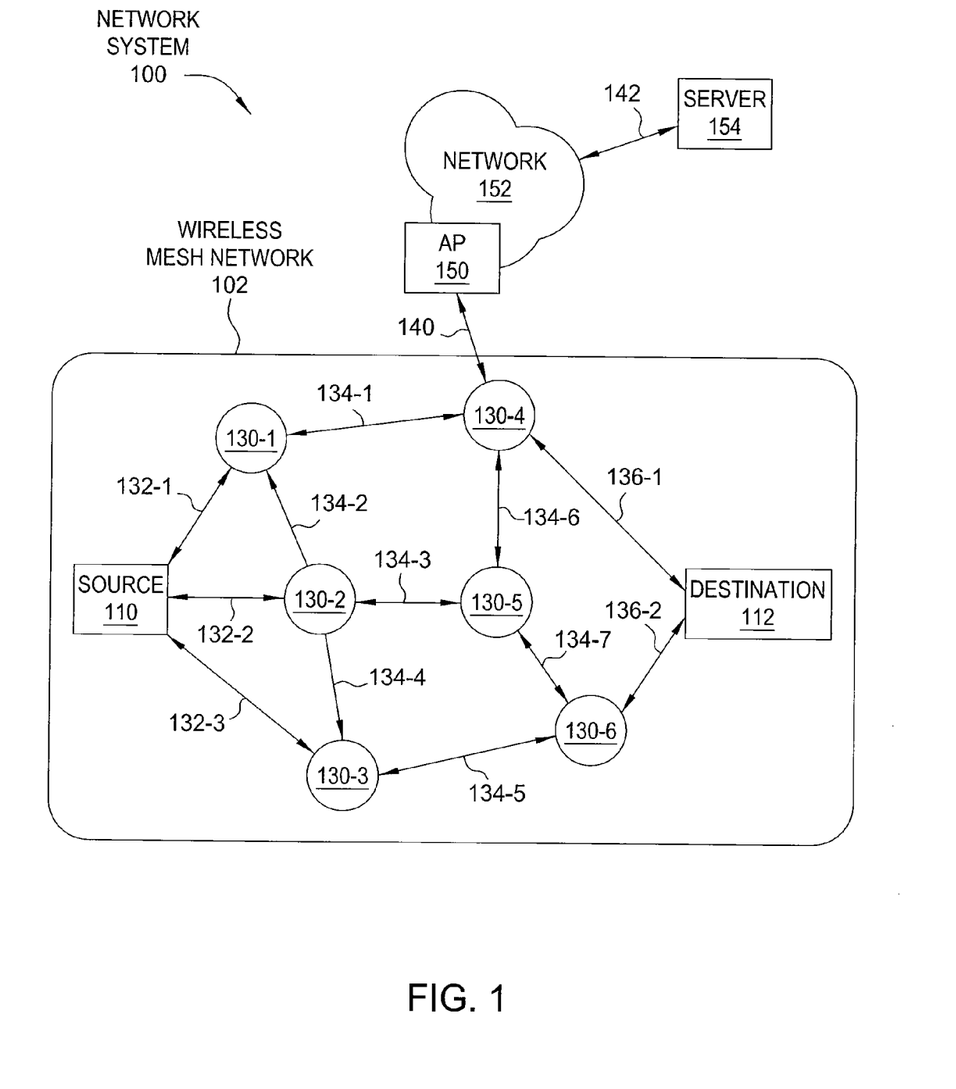
FIG. 1 illustrates a network system, according to one embodiment of the invention.

FIG. 1 illustrates a network system 100, according to one embodiment of the invention. The network system 100 comprises a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, a network 152, and a server 154.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing from the scope and spirit of embodiments of the present invention.

The discovery protocol may also be implemented to determine the hopping sequences of adjacent nodes, i.e. the sequence of channels across which nodes periodically receive payload data. As is known in the art, a "channel" may correspond to a particular range of frequencies. The time required by a node 130 to cycle through all channels in the hopping sequence associated with that node is referred to as an "epoch." An epoch may be divided into "timeslots" that correspond to intervals of time during which a node 130 receives payload data on a given channel. By implementing the discovery protocol and retrieving the hopping sequences of adjacent nodes, a node 130 may optimize the transmission of high-priority messages to those adjacent nodes, as described in greater detail below and in conjunction with FIGS. 3-4.

Once adjacency is established between the source node 110 and at least one intermediate node 130, the source node 110 may generate payload data for delivery to the destination node 112, assuming a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or Ethernet media access control (MAC) address.

Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address, and each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

In network system 100, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The network 152 is coupled to the server 154 via communications link 142. The access point 150 is coupled to the network 152, which may comprise any wired, optical, wireless, or hybrid network configured to transmit payload data between the access point 150 and the server 154.

In one embodiment, the server 154 represents a destination for payload data originating within the wireless mesh network 102 and a source of payload data destined for one or more nodes within the wireless mesh network 102. In one embodiment, the server 154 executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting.

In some situations, the server 154 broadcasts payload data to nodes 130 that includes high-priority messages affecting the functionality of the nodes 130. For example, the wireless mesh network 102 may occasionally need to shed emergency load, and so server 154 may broadcast a high-priority message to nodes 130 that commands the nodes 130 to offload the emergency load according to certain specifications. When situations arise that cause the server 154 to broadcast a high-priority message, server 154 transmits the message to wireless mesh network 102 via access point 150. Access point 150 may then forward the message to, e.g., node 130-4. Node 130-4 may then cause the message to propagate across wireless mesh network 102 via the other nodes 130 within that network.

In order to facilitate the efficient delivery of high-priority messages to a large fraction of nodes 130 within wireless mesh network 102, each node 130 is configured to forward high-priority messages to adjacent nodes 130 based on analyzing the hopping sequences of those adjacent nodes, as mentioned above. In doing so, a given node 130 may employ a first technique for transmitting a high-priority message that minimizes the amount of time required to transmit the message to adjacent nodes, according to a first embodiment of the invention. Additionally, the node 130 may also employ a second technique for transmitting the high priority message that minimizes the number of transmissions required to transmit the message to adjacent nodes, according to a second embodiment of the invention.

In the first embodiment, when a given node 130 receives a high-priority message (e.g., from access point 150 or from an upstream node 130), the node 130 analyzes the hopping sequences of adjacent nodes and identifies the channel on which the largest subset of adjacent nodes will receive transmissions during a subsequent timeslot. When the subsequent timeslot arrives, the node 130 transmits the high-priority message on the identified channel to the subset of adjacent nodes currently receiving transmission on that channel. The node 130 then excludes that subset of adjacent nodes from the set of adjacent nodes, and then analyzes the hopping sequences of the remaining nodes in order to identify the channel on which the largest remaining subset of adjacent nodes will receive transmissions during another subsequent timeslot. Node 130 may repeat this process until all adjacent nodes have been excluded from the set of adjacent nodes. When implementing the technique described above, the node 130 may transmit the high-priority message during each subsequent timeslot until all adjacent nodes have been excluded from the set of adjacent nodes, thereby minimizing the amount of time required to broadcast the high-priority message to those adjacent nodes. The first embodiment is described in greater detail below in conjunction with FIG. 3.

In the second embodiment, when a given node 130 receives a high-priority message, the node 130 analyzes the hopping sequences of adjacent nodes and determines the set of channels on which adjacent nodes receive transmissions. The node 130 then selects a channel from the set of channels and identifies a timeslot within a subsequent epoch during which the greatest number of adjacent nodes will be capable of receiving transmissions on the selected channel. The node 130 then associates the selected channel with the identified timeslot. The node 130 repeats this process for each channel in the set of channels, thereby associating each channel with a timeslot. During the subsequent epoch, at each timeslot that is associated with a channel, the node 130 transmits the high-priority message on that channel. When implementing the technique described above, the node 130 may transmit the high-priority message just once on each channel, thereby minimizing the number of transmissions required to broadcast the high-priority message to the adjacent nodes. The second embodiment is described in greater detail below in conjunction with FIG. 4.

The first and second embodiments of the invention, as described above, may be implemented within some or all of the nodes 130 in order to ensure efficient delivery of high-priority messages without requiring those nodes to tune in to a frequency reserved solely for high-priority messages.

The techniques described herein are sufficiently flexible to be utilized within any technically feasible network environment including, without limitation, a wide-area network (WAN) or a local-area network (LAN). Moreover, multiple network types may exist within a given network system 100. For example, communications between two nodes 130 or between a node 130 and the corresponding access point 150 may be via a radio-frequency local-area network (RF LAN), while communications between access points 150 and the network may be via a WAN such as a general packet radio service (GPRS). As mentioned above, each node within wireless mesh network 102 includes a network interface that enables the node to communicate wirelessly with other nodes. Each node 130 may implement the first and/or second embodiments of the invention, as described above, by operation of the network interface. An exemplary network interface is described below in conjunction with FIG. 2.

Figure 2:
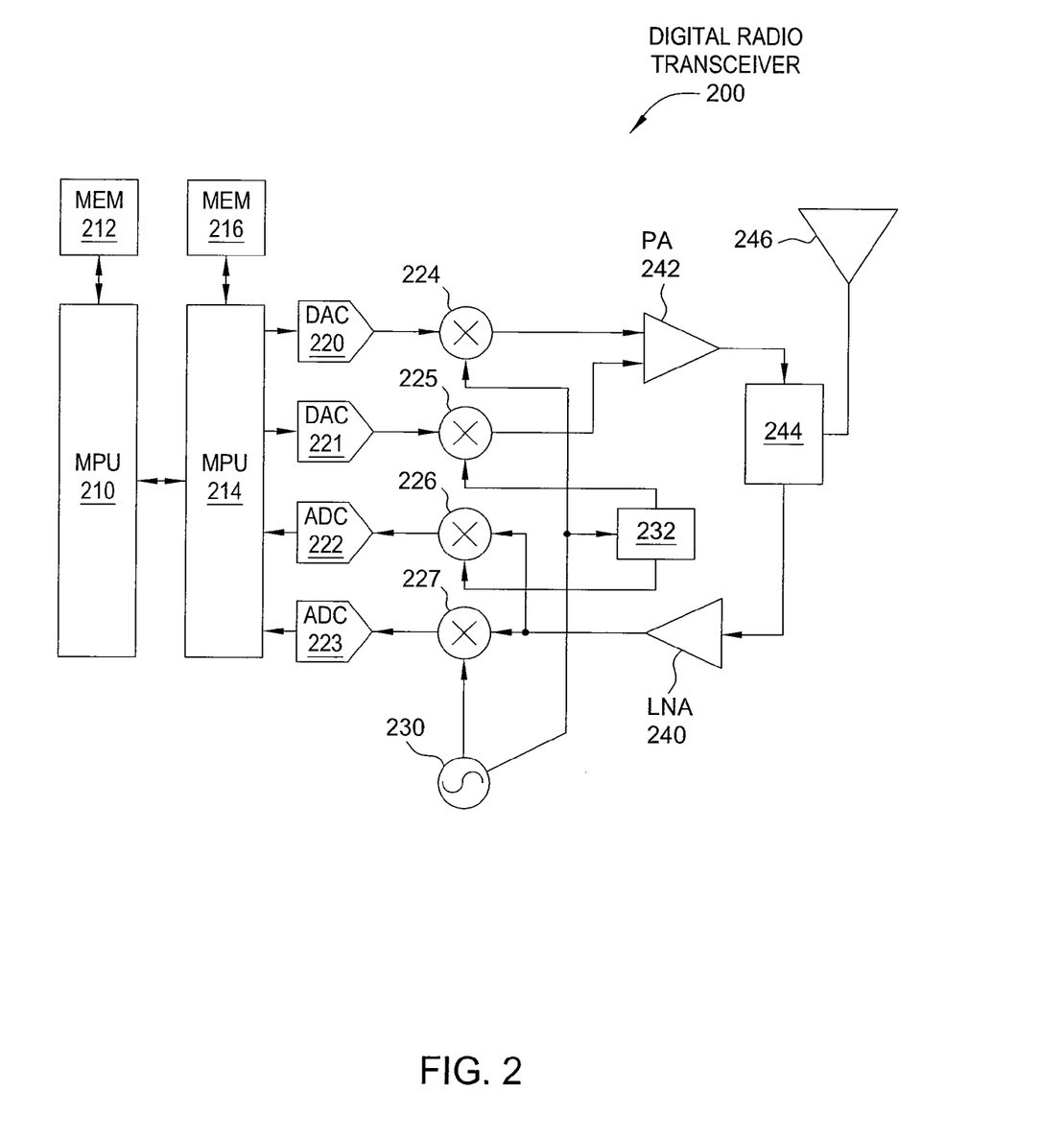
FIG. 2 illustrates a network interface configured to transmit and receive data within a mesh network, according to one embodiment of the invention.

FIG. 2 illustrates a network interface 200 configured to implement multi-channel operation, according to one embodiment of the invention. Each node 110, 112, 130 within the wireless mesh network 102 of FIG. 1 includes at least one instance of the network interface 200. The network interface 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. A memory 212 may be coupled to the MPU 210 for local program and data storage. Similarly, a memory 216 may be coupled to the DSP 214 for local program and data storage. Memory 212 and/or memory 216 may be used to store data structures such as, e.g., a forwarding database, and/or routing tables that include primary and secondary path information, path cost values, and so forth.

In one embodiment, the MPU 210 implements procedures for processing IP packets transmitted or received as payload data by the network interface 200. The procedures for processing the IP packets may include, without limitation, wireless routing, encryption, authentication, protocol translation, and routing between and among different wireless and wired network ports. In one embodiment, MPU 210 implements the techniques performed by the node, as described in conjunction with FIGS. 1 and 3-4, when MPU 210 executes a firmware program stored in memory within network interface 200.

The DSP 214 is coupled to DAC 220 and DAC 221. Each DAC 220, 221 is configured to convert a stream of outbound digital values into a corresponding analog signal. The outbound digital values are computed by the signal processing procedures for modulating one or more channels. The DSP 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values. Persons having ordinary skill in the art will recognize that network interface 200 represents just one possible network interface that may be implemented within wireless mesh network 102 shown in FIG. 1, and that any other technically feasible device for transmitting and receiving data may be incorporated within any of the nodes within wireless mesh network 102.

Figure 3:
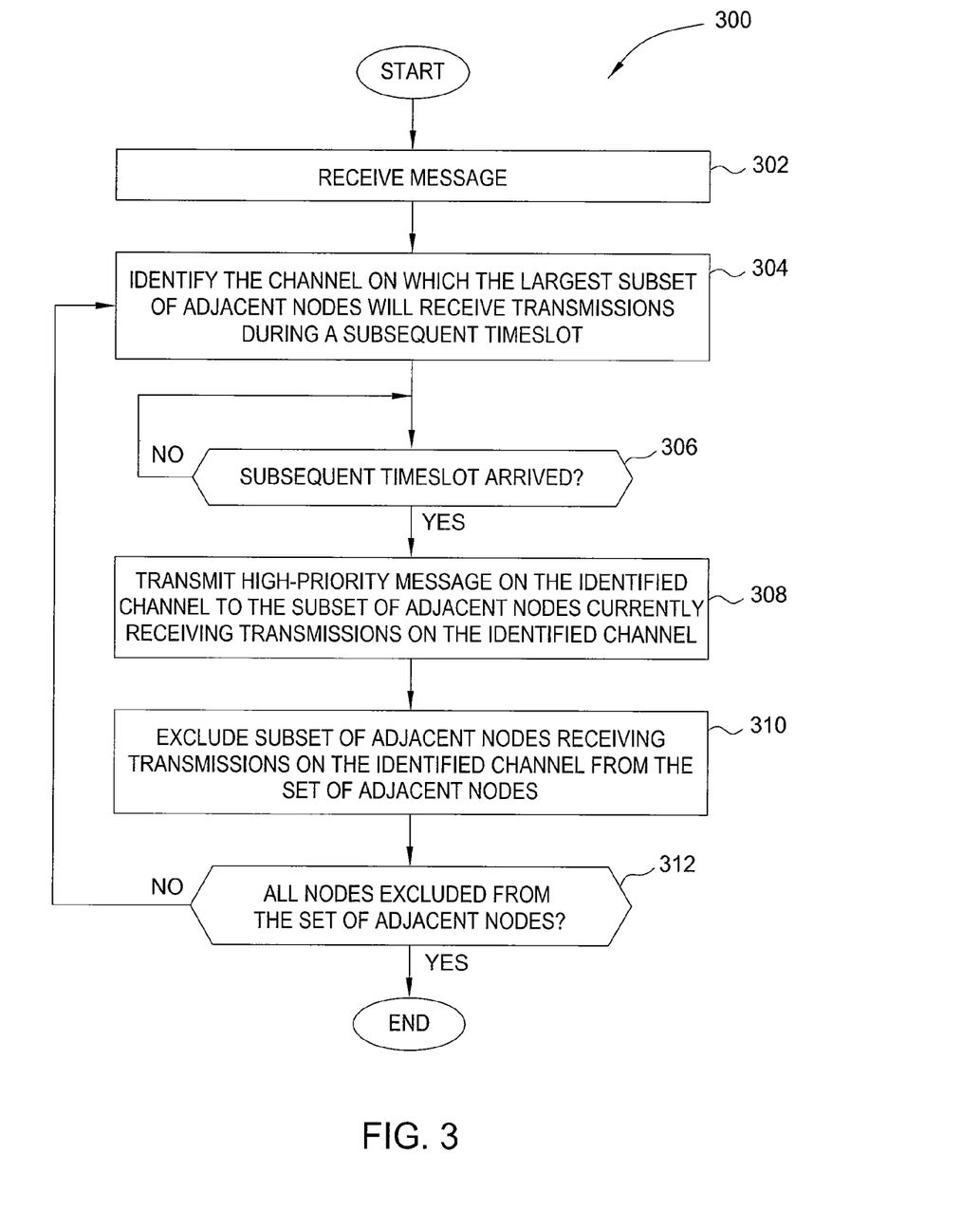
FIG. 3 is a flowchart of method steps illustrating a first technique for transmitting a message to a set of neighboring nodes.

FIG. 3 is a flowchart of method steps illustrating a first technique for transmitting a message to a set of neighboring nodes. Although the method 300 is described in conjunction with the systems of FIGS. 1-2, persons of ordinary skill in the art will understand that any system configured to perform the method steps, in any order, is within the scope of the present invention. The method 300 may be performed by any of the nodes within wireless mesh network 102, including nodes 110, 112, or 130.

As shown, the method 300 begins at step 302, where a node 130 receives a message, such as, e.g., a high-priority message. The message could originate from, e.g., the server 154. At step 304, the node 130 identifies the channel on which the largest subset of adjacent nodes will receive transmissions during a subsequent timeslot. The node 130 could, for example, divide the adjacent nodes into one or more subsets based on the hopping sequences associated with each adjacent node. Each such subset would include adjacent nodes capable of receiving transmissions during the subsequent time slot on the same channel, and the nodes within a given subset would be capable of receiving transmissions during the subsequent timeslot on a different channel than nodes in other subsets. The node 130 would then select the subset that includes the greatest number of nodes, and then identify the channel on which the nodes in that subset will be capable of receiving transmissions during the subsequent timeslot.

At step 306, the node pauses until the subsequent timeslot has arrived. At step 308, the node 130 transmits the message on the channel identified at step 304 to the subset of adjacent nodes currently receiving transmissions on the identified channel. At step 310, the node 130 excludes that subset of adjacent nodes from the set of adjacent nodes, since the message has been transmitted to those nodes and presumably received. At step 312, the node 130 determines whether all adjacent nodes have been excluded from the set of adjacent nodes. If the node 130 determines that all adjacent nodes have not been excluded from the set of adjacent nodes, then the method 300 return to step 304 and proceeds as described above. Otherwise, if node 130 determines that all adjacent nodes have been excluded from the set of adjacent nodes, then the method 300 ends.

By implementing the method 300, each node 130 may minimize the amount of time required to forward a high-priority message to adjacent nodes. The nodes 130 may also implement a second technique, mentioned above and described in greater detail below in conjunction with FIG. 4.

Figure 4:
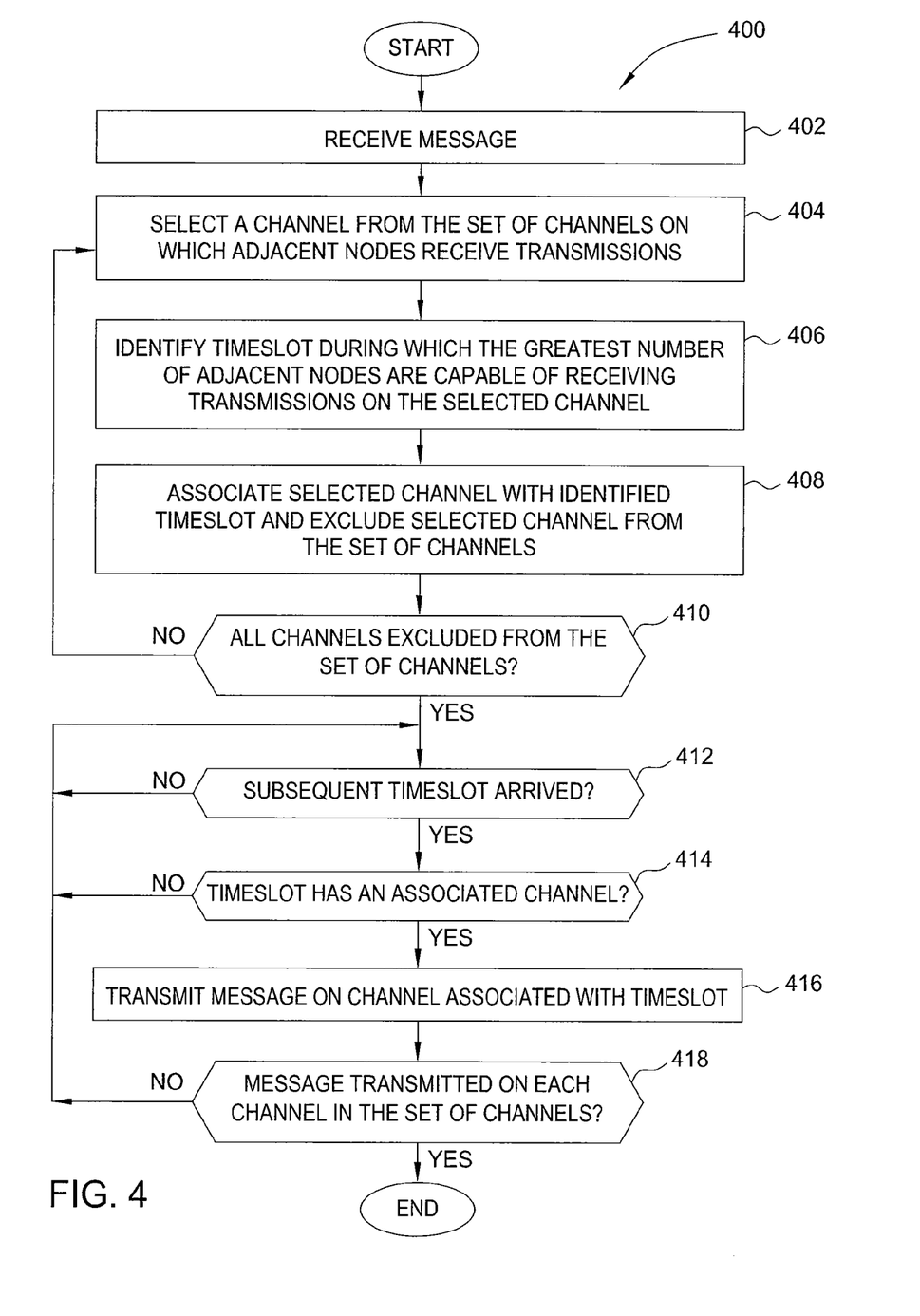
FIG. 4 is a flowchart of method steps illustrating a second technique for transmitting a message to a set of neighboring nodes, according to one embodiment of the invention.

FIG. 4 is a flowchart of method steps illustrating a second technique for transmitting a message to a set of neighboring nodes, according to one embodiment of the invention. Although the method 400 is described in conjunction with the systems of FIGS. 1-2, persons of ordinary skill in the art will understand that any system configured to perform the method steps, in any order, is within the scope of the present invention. The method 400 may be performed by any of the nodes within wireless mesh network 102, including nodes 110, 112, or 130.

As shown, the method 400 begins at step 402, where a node 130 receives a message, such as, e.g., a high-priority message. The message could originate from, e.g., the server 154. At step 404, the node 130 selects a channel from the set of channels on which adjacent nodes receive transmissions. The node 130 may identify the set of channels on which adjacent nodes receive transmissions based on analyzing the hopping sequences of the adjacent nodes. At step 406, the node 130 identifies a timeslot during which the greatest number of adjacent nodes will receive transmissions on the selected channel. The node 130 may analyze each timeslot within a subsequent epoch and determine, based on the hopping sequences of the adjacent nodes, which adjacent nodes will be able to receive transmissions on the selected channel during a given timeslot. At step 408, the node 130 associates the channel selected at step 404 with the timeslot identified at step 406 and excludes the selected channel from the set of channels. At step 410, the node 130 determines whether all channels have been excluded from the set of channels. If at step 410 the node 130 determines that all channels have not been excluded from the set of channels, then the method 400 returns to step 404 and proceeds as described above. Otherwise, if the node 130 determines at step 410 that all channels have been excluded from the set of channels, then the method 400 proceeds to step 412.

At step 412, the node 130 waits until the subsequent timeslot has arrived. At step 414, the node 130 determines whether a channel was associated with the timeslot (e.g. at step 408). If the node 130 determines that the timeslot has an associated channel, then the method 400 proceeds to step 416, where the node 130 transmits the message on the channel associated with the current timeslot. The method then proceeds to step 418. Referring back to step 414, if the node 130 determines that the timeslot does not have an associated channel, then the method 400 proceeds directly to step 418 and skips step 416. At step 418, the node 130 determines whether the message was transmitted on each channel in the set of channels. If at step 418 the node 130 determines that the message was not transmitted on each channel in the set of channels, then the method 400 returns to step 412 and proceeds as described above. Otherwise, if at step 418 the node 130 determines that the message was in fact transmitted on each channel in the set of channels, then the method 400 ends.

By implementing the method 400, each node 130 may minimize the number of transmissions required to forward a high-priority message to adjacent nodes.

In sum, a node within a wireless mesh network is configured to forward a high-priority message to adjacent nodes in the wireless mesh network by either (i) transmitting the message during successive timeslots to the largest subset of nodes capable of receiving transmissions during each timeslot, or (ii) transmitting the message on each different channel during the timeslot when the largest subset of nodes are capable of receiving transmissions on each of those channels.

Advantageously, nodes in the wireless mesh network are not required to periodically tune-in to a reserved channel to listen for high-priority messages, thereby improving the efficiency and throughput of the wireless mesh network as a whole.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method for transmitting a message from a first node residing within a network to a set of nodes residing adjacent to the first node, the method comprising:
    dividing the set of nodes residing adjacent to the first node into one or more subsets of nodes, wherein the nodes within a particular subset of nodes are capable of receiving transmissions on a particular channel during a particular time interval in a sequence of time intervals, wherein the nodes in subsets of nodes other than the particular subset of nodes receive transmissions on a channel different than the particular channel during the particular time interval;
    identifying a first subset of nodes in the one or more subsets of nodes that includes more nodes than any of the other subsets of nodes, wherein the nodes in the first subset of nodes are capable of receiving transmissions on a first channel during a first time interval in the sequence of time intervals; and
    transmitting the message to the nodes in the first subset of nodes on the first channel during the first time interval.

2. The computer-implemented method of claim 1, further comprising:
    excluding the first subset of nodes from the one or more subsets of nodes;
    identifying a second subset of nodes in the one or more subsets of nodes that includes more nodes than any of the other subsets of nodes in the one or more subsets of nodes, wherein the nodes in the second subset of nodes are capable of receiving transmissions on a second channel during a second time interval in the sequence of time intervals; and
    transmitting the message to the nodes in the second subset of nodes on the second channel during the second time interval.

3. The computer-implemented method of claim 2, further comprising determining that all subsets of nodes have been excluded from the one or more subsets of nodes.

4. The computer-implemented method of claim 1, wherein identifying the first subset of nodes comprises analyzing channel hopping sequences associated with the nodes residing adjacent to the first node.

5. The computer-implemented method of claim 1, wherein the network comprises a wireless mesh network configured to manage the operation of an electricity distribution infrastructure.

6. The computer-implemented method of claim 1, further comprising transmitting the message to each subset of nodes in the one or more subsets of nodes excluding the first subset of nodes during each different time interval in the sequence of time intervals excluding the first time interval.

7. The computer-implemented method of claim 1, wherein the message comprises a high-priority message instructing the nodes in the network to respond to an emergency.

8. A non-transitory computer-readable medium storing program instructions that, when executed by a processing unit, cause the processing unit to transmit a message from a first node residing within a network to a set of nodes residing adjacent to the first node by performing the steps of:
    dividing the set of nodes residing adjacent to the first node into one or more subsets of nodes, wherein the nodes within a particular subset of nodes are capable of receiving transmissions on a particular channel during a particular time interval in a sequence of time intervals, wherein the nodes in subsets of nodes other than the particular subset of nodes receive transmissions on a channel different than the particular channel during the particular time interval;

identifying a first subset of nodes in the one or more subsets of nodes that includes more nodes than any of the other subsets of nodes, wherein the nodes in the first subset of nodes are capable of receiving transmissions on a first channel during a first time interval in the sequence of time intervals; and transmitting the message to the nodes in the first subset of nodes on the first channel during the first time interval.

9. The non-transitory computer-readable medium of claim 8, further comprising the steps of:

excluding the first subset of nodes from the one or more subsets of nodes;

identifying a second subset of nodes in the one or more subsets of nodes that includes more nodes than any of the other subsets of nodes in the one or more subsets of nodes, wherein the nodes in the second subset of nodes are capable of receiving transmissions on a second channel during a second time interval in the sequence of time intervals; and transmitting the message to the nodes in the second subset of nodes on the second channel during the second time interval.

10. The non-transitory computer-readable medium of claim 9, further comprising determining that all subsets of nodes have been excluded from the one or more subsets of nodes.

11. The non-transitory computer-readable medium of claim 8, wherein the step of identifying the first subset of nodes comprises analyzing channel hopping sequences associated with the nodes residing adjacent to the first node.

12. The non-transitory computer-readable medium of claim 8, wherein the network comprises a wireless mesh network configured to manage the operation of an electricity distribution infrastructure.

13. The non-transitory computer-readable medium of claim 8, further comprising transmitting the message to each subset of nodes in the one or more subsets of nodes excluding the first subset of nodes during each different time interval in the sequence of time intervals excluding the first time interval.

14. The non-transitory computer-readable medium of claim 8, wherein the message comprises a high-priority message instructing the nodes in the network to respond to an emergency.

15. A computing device configured to transmit a message from a first node residing within a network to a set of nodes residing adjacent to the first node, including:

a processing unit configured to:

divide the set of nodes residing adjacent to the first node into one or more subsets of nodes, wherein the nodes within a particular subset of nodes are capable of receiving transmissions on a particular channel during a particular time interval in a sequence of time intervals, wherein the nodes in subsets of nodes other than the particular subset of nodes receive transmissions on a channel different than the particular channel during the particular time interval;

identify a first subset of nodes in the one or more subsets of nodes that includes more nodes than any of the other subsets of nodes, wherein the nodes in the first subset of nodes are capable of receiving transmissions on a first channel during a first time interval in the sequence of time intervals; and transmit the message to the nodes in the first subset of nodes on the first channel during the first time interval.

16. The computing device of claim 15, further comprising:

a memory unit coupled to the processing unit and storing program instructions that, when executed by the processing unit, cause the processing unit to:

divide the set of nodes residing adjacent to the first node into one or more subsets of nodes;

identify the first subset of nodes in the one or more subsets of nodes; and transmit the message to the nodes in the first subset of nodes.

17. The computing device of claim 15, further configured to:

exclude the first subset of nodes from the one or more subsets of nodes;

identify a second subset of nodes in the one or more subsets of nodes that includes more nodes than any of the other subsets of nodes in the one or more subsets of nodes, wherein the nodes in the second subset of nodes are capable of receiving transmissions on a second channel during a second time interval in the sequence of time intervals; and transmit the message to the nodes in the second subset of nodes on the second channel during the second time interval.

18. The computing device of claim 15, further configured to identify the first subset of nodes by analyzing channel hopping sequences associated with the nodes residing adjacent to the first node.

19. The computing device of claim 15, wherein the network comprises a wireless mesh network configured to manage the operation of an electricity distribution infrastructure.

20. The computing device of claim 15, wherein the message comprises a high-priority message instructing the nodes in the network to respond to an emergency.

* * * * *

UNITED STATES PATENT AND TRADEMARK OFFICE
CERTIFICATE OF CORRECTION

PATENT NO. : 8,873,518 B2  
APPLICATION NO. : 13/625754  
DATED : October 28, 2014  
INVENTOR(S) : Van Greunen et al.

Page 1 of 1

It is certified that error appears in the above-identified patent and that said Letters Patent is hereby corrected as shown below:

On the Title Page, Item (71) Applicant:

Please delete "Springs" and insert --Spring-- therefor.

Signed and Sealed this
Twenty-fourth Day of February, 2015

Michelle K. Lee
*Deputy Director of the United States Patent and Trademark Office*